(12) United States Patent
Rauner (10) Patent No.: US 8,731,755 B2
(45) Date of Patent: May 20, 2014

(54) DRIVE METHOD AND DRIVE DEVICE FOR A HYBRID VEHICLE

(75) Inventor: Thomas Rauner, Blaubeuren (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 189 days.

(21) Appl. No.: 13/332,520

(22) Filed: Dec. 21, 2011

(65) Prior Publication Data

US 2012/0166029 A1    Jun. 28, 2012

(30) Foreign Application Priority Data

Dec. 22, 2010   (DE) .......................... 10 2010 061 479

(51) Int. Cl.
*B60W 20/00* (2006.01)
*B60K 6/387* (2007.10)

(52) U.S. Cl.
USPC ...................... 701/22; 701/51; 701/67; 477/2

(58) Field of Classification Search
USPC ................................ 701/22, 54, 29, 51, 67, 69
See application file for complete search history.

(56) References Cited

U.S. PATENT DOCUMENTS

| | | | |
|---|---|---|---|
| 6,278,915 B1 * | 8/2001 | Deguchi et al. | 701/22 |
| 6,971,968 B2 * | 12/2005 | Imazu et al. | 477/2 |
| 7,908,067 B2 * | 3/2011 | Soliman et al. | 701/54 |
| 8,126,604 B2 * | 2/2012 | McGrogan et al. | 701/22 |
| 2002/0105188 A1 | 8/2002 | Tomikawa | |
| 2004/0134698 A1 | 7/2004 | Yamamoto | |
| 2005/0107198 A1 | 5/2005 | Sowul | |
| 2009/0093336 A1 | 4/2009 | Soliman | |
| 2011/0257826 A1 * | 10/2011 | Yu et al. | 701/29 |

FOREIGN PATENT DOCUMENTS

| | | |
|---|---|---|
| DE | 10012221 A1 | 10/2001 |
| DE | 10232312 A1 | 3/2003 |
| DE | 10319108 A1 | 12/2003 |
| DE | 102007023164 A1 | 11/2008 |
| WO | WO-2009019580 A2 | 2/2009 |

OTHER PUBLICATIONS

German Application Serial No. 10 2010 061 479.3, Search Report mailed Oct. 19, 2011, 4 pgs.

* cited by examiner

*Primary Examiner* — Tan Q Nguyen
(74) *Attorney, Agent, or Firm* — RatnerPrestia (57) ABSTRACT

A drive device for a hybrid vehicle, which has a first driven axle and a second driven axle, including: a first motor/generator unit, which is connected to the first driven axle; an internal combustion engine unit, which is connected in a rotationally fixed fashion to a differential/transmission unit which is connected to the rear axle; a second motor/generator unit, which is connected in a rotationally fixed fashion to the differential/transmission unit, parallel to the internal combustion engine unit; a clutch unit, which is designed to disconnect and connect a force flux between the differential/transmission unit and the second driven axle; and a control unit, which actuates the clutch unit, the internal combustion engine unit, the first motor/generator unit and the second motor/generator unit as a function of predefined operating states.

12 Claims, 7 Drawing Sheets

| BST | EVA | EHA | VKM |
|-----|-----|-----|-----|
| LPV | M | M | E |
| REK | G | G/M | E |
| REX | M | G | A |
| | M | G | E |

FIG. 3

|      | EVA | EHA | VKM |
|------|-----|-----|-----|
| LSP  | G   | G   | A   |
| RWF  | M   | A   | A   |
| AMP  | M   | M   | Z   |
| ELAL | M   | G/M | E   |

FIG. 4

|  | EVA | EHA | VKM |
|---|---|---|---|
| EU20 | M | A | A |
| EU7 | G/M//M | G/M//M | E//A |
| FTP20 | M | A | A |
| HGW | M | A | A |
| USFTP | M | M | A |
| SC03 | M | A | A |
| FTP7 | G/M//M | G/M//M | E//A |
| JC08 | M | A | A |

DRIVE METHOD AND DRIVE DEVICE FOR A HYBRID VEHICLE

CROSS-REFERENCE TO RELATED APPLICATION

This U.S. patent application claims priority to German Patent Application DE 102010061479.3, filed Dec. 22, 2010, which is incorporated by reference herein in its entirety.

FIELD OF THE INVENTION

The present invention relates to a drive method and a drive device for a hybrid vehicle.

BACKGROUND OF THE INVENTION

Hybrid drives have different structure variants for the transmission, to the drive wheels of a hybrid vehicle, of power which is generated by an internal combustion engine and power which is generated by an electric motor.

US 2009/0093336 A1, which is incorporated by reference herein, describes an automatic clutch of a hybrid vehicle. The described automatic clutch is used in a drive train of a hybrid vehicle which comprises a crankshaft, a motor generator unit, a transmission unit and a clutch unit, wherein the hybrid vehicle also has a traction battery and an internal combustion engine. In addition, the vehicle clutch control system comprises a plurality of drive train operating modes.

DE 100 12 221 A1, which is incorporated by reference herein, describes a hybrid drive unit for motor vehicles, which hybrid drive device has a main drive train between a main motor and a main transmission which has a variable transmission ratio, and has or can have a drive connection to a first vehicle wheel axle. In addition, in the described hybrid drive device for motor vehicles, an electric machine has or can have a drive connection to the main drive train and a second electric machine has or can have a drive connection to a second vehicle axle.

DE 102 32 312 A1, which is incorporated by reference herein, describes a drive system for a motor vehicle having at least one electric motor/generator which is connected to an electric accumulator and which is connected to a drive axle, in addition having a first piston internal combustion engine and at least one further piston internal combustion engine as well as having a transmission which connects the piston internal combustion engines and which can be connected via a shiftable main clutch to a drive axle, and having a clutch which is arranged between the further piston internal combustion engine and the transmission.

SUMMARY OF THE INVENTION

The invention makes available an improved drive device and an improved drive method for a hybrid vehicle, wherein the adaptation of the operating states is made possible according to a predefined operating strategy.

Accordingly, according to aspects of the invention, a drive device is made available for a hybrid vehicle which has a first driven axle (VA) and a second driven axle (HA), comprising:
- a first motor/generator unit (EVA), which is connected to the first driven axle (VA);
- an internal combustion engine unit (VKM), which is connected in a rotationally fixed fashion to a differential/transmission unit (PDK) which is connected to the rear axle (HA);
- a second motor/generator unit (EHA), which is connected in a rotationally fixed fashion to the differential/transmission unit (PDK), parallel to the internal combustion engine unit (VKM);
- a clutch unit (FK), which is designed to disconnect and connect a force flux between the differential/transmission unit (PDK) and the second driven axle (HA); and
- a control unit (SE), which actuates the clutch unit (FK), the internal combustion engine unit (VKM), the first motor/generator unit (EVA) and the second motor/generator unit (EHA) as a function of predefined operating states.

A drive method is made available for a hybrid vehicle which has a first driven axle (VA) and a second driven axle (HA), a first motor/generator unit (EVA) which is connected to the first driven axle (VA) and a differential/transmission unit (PDK) which is connected to the second driven axle (HA) and which is connected to an internal combustion engine unit (VKM) and to a second motor/generator unit (EHA), wherein a clutch unit (FK) is used to disconnect and connect a force flux between the differential/transmission unit (PDK) and the second driven axle (HA); and wherein a control unit (SE) actuates the clutch unit (FK), the internal combustion engine unit (VKM), the first motor/generator unit (EVA) and the second motor/generator unit (EHA) as a function of predefined operating states.

The drive method according to aspects of the invention, and the drive device according to aspects of the invention, have the advantage that they permit adaptation of the operating states of the hybrid vehicle according to an operating strategy with a simplified design of the drive device.

According to the invention, an electric motor/generator unit is connected in a rotationally fixed fashion to the internal combustion unit of the hybrid vehicle and, in particular, cannot be uncoupled from an input shaft of a differential/transmission unit.

According to one preferred development, the first motor/generator unit is embodied with two electric machines which are each connected to wheels of the first driven axle.

According to a further preferred development, the clutch unit is embodied as a frictionally engaging clutch which can be shifted by the control unit.

According to a further preferred development, the first motor/generator unit and the second motor/generator unit can each be controlled by the control unit in a motor mode or in a generator mode.

According to one preferred development of the drive method, the drive method has operating states which are called by the control unit wherein in a first operating state, when the internal combustion engine unit is switched on, the first motor/generator unit and the second motor/generator unit are operated by motor, wherein in a second operating state, when the internal combustion engine unit is switched on, the first motor/generator unit is operated as a generator and the second motor/generator unit is operated as a generator or motor, wherein in a third operating state, when the internal combustion engine unit is switched off, the first motor/generator unit is operated as a motor and the second motor/generator unit is operated as a generator, wherein in a fourth operating state, when the internal combustion engine unit is switched on, the first motor/generator unit is operated as a motor and the second motor/generator unit is operated as a generator.

According to a further preferred development of the drive method, the drive method has a further operating state which is called by the control unit, wherein, when the internal combustion engine unit is switched off, the first motor/generator unit and the second motor/generator unit are operated as generators.

According to a further preferred development of the drive method, the drive method has a further operating state which is called by the control unit, wherein, when the internal combustion engine unit is switched off, the first motor/generator unit is operated as a motor.

According to a further preferred development of the drive method, the drive method has a further operating state which is called by the control unit, wherein, when the internal combustion engine unit is starting, the first motor/generator unit and the second motor/generator unit are operated as a motor.

According to a further preferred development of the drive method, the drive method has a further operating state, which is called by the control unit, wherein, when the internal combustion engine unit is switched on, the first motor/generator unit is operated as a motor and the second motor/generator unit is operated as a motor or as a generator.

According to a further preferred development of the drive method, the drive method has a first changeover of operating state, which permits a changeover from an operating state with a switched-off internal combustion engine unit to an operating state with a switched-on internal combustion engine unit, by operating the second motor/generator unit as a motor.

According to a further preferred development of the drive method, the drive method has a second changeover of operating state, which permits a changeover from an operating state with a switched-off internal combustion engine unit to an operating state with a switched-on internal combustion engine unit by entraining the internal combustion engine unit.

BRIEF DESCRIPTION OF THE DRAWING FIGURES

Exemplary embodiments of the invention are illustrated in the drawings and explained in more detail in the following description, in which.

DETAILED DESCRIPTION OF THE PREFERRED EMBODIMENTS

In the Figures, the same reference symbols denote identical or functionally identical elements, unless stated otherwise.

Figure 1:
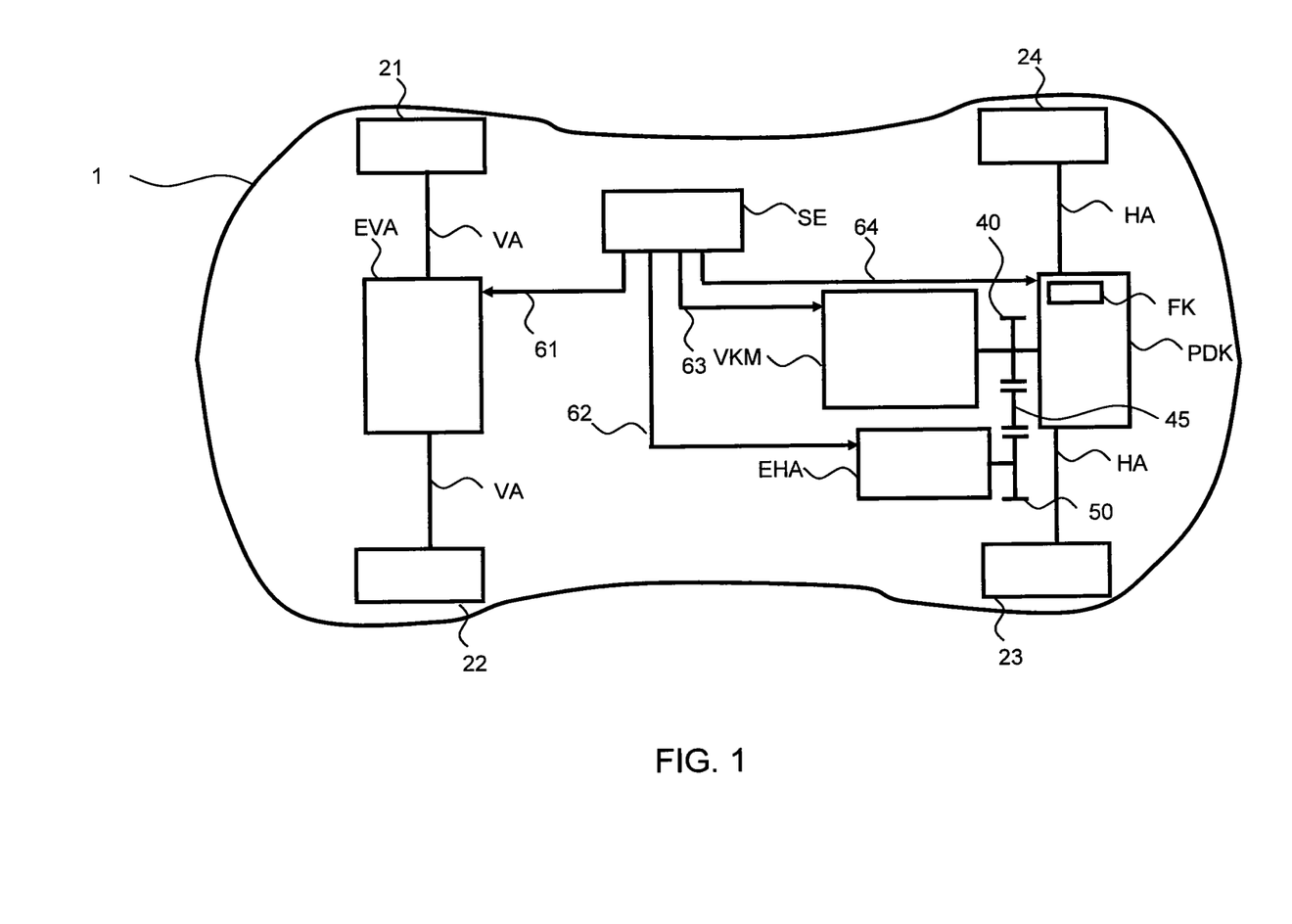
FIG. 1 shows an exemplary illustration of a hybrid vehicle with a drive device according to a first embodiment of the present invention.

In FIG. 1, reference symbol 1 denotes a hybrid vehicle which has a drive device. The drive device comprises here a first motor/generator unit EVA which is connected to a first driven axle VA (front axle). In addition, the drive device comprises an internal combustion engine unit, VKM, which is connected to a second driven axle HA (rear axle) via a differential/transmission unit PDK.

In addition, the drive device has a second motor/generator unit EHA, which is connected to the second driven axle HA via the differential/transmission unit PDK, parallel to the internal combustion engine unit VKM, and via a clutch unit FK, which is designed to disconnect and connect a force flux between the differential/transmission unit PDK and the second driven axle HA.

In addition, the drive device comprises a control unit SE, which actuates the clutch unit FK, the internal combustion engine unit VKM, the first motor/generator unit EVA and the second motor/generator unit EHA as a function of predefined operating states.

In the present example, a wheel 21 and a wheel 22 are connected to the first driven axle VA. In addition, a wheel 23 and a wheel 24 are connected to the second driven axle HA. The second motor/generator unit EHA is connected to the internal combustion engine unit VKM via a first transmission element 50, via a second transmission element 45 and via a third transmission element 40.

In addition, the third transmission element 40 connects the internal combustion engine unit VKM to the differential/transmission unit PDK. The differential/transmission unit PDK is embodied, for example, as a double clutch transmission or as an automated transmission which permits a fully automatic change of gear speed, by means of two component-transmissions, without an interruption in the tractive force, and also comprises the clutch unit FK.

The control unit SE is connected to the first motor/generator unit EVA via the first control line 61. In addition, the control unit SE is connected to the second motor/generator unit EHA via a second control line 62, and to the internal combustion engine unit VKM via a third control line 63, as well as to the differential/transmission unit PDK via a fourth control line 64.

Figure 2:
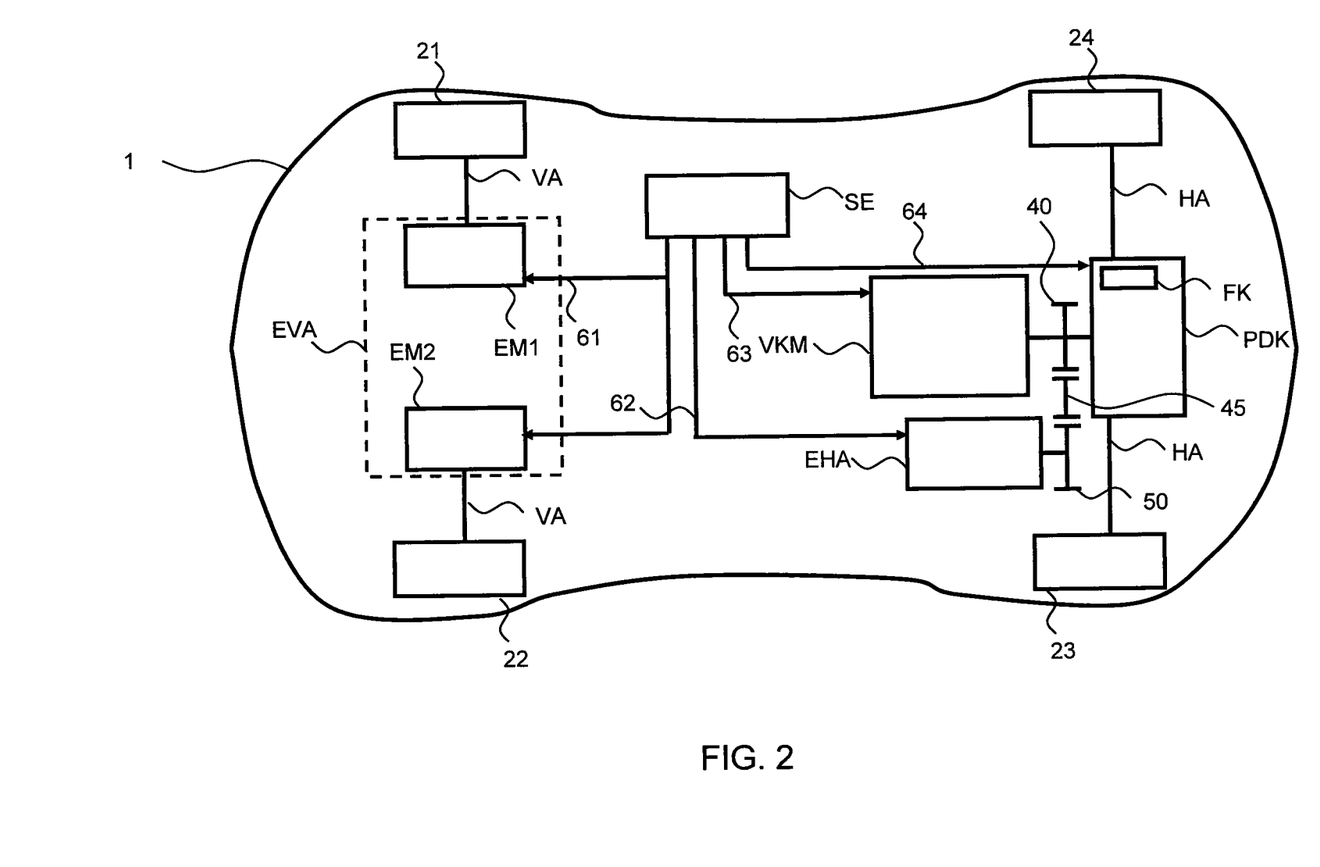
FIG. 2 shows an exemplary illustration of a drive device for a hybrid vehicle according to a further embodiment of the present invention.

FIG. 2 shows a hybrid vehicle 1 with a drive device according to a further embodiment of the present invention. In contrast to FIG. 1, FIG. 2 shows how a first motor/generator unit EVA is embodied with two separate electric machines EM1 and EM2. In this context, the first electric machine EM1 is connected to the wheel 21 via the first driven axle VA. In addition, the second electric machine EM2 is connected to the wheel 22 via the first driven axle VA. The reference symbols in FIG. 2 which are not mentioned are explained in the description of FIG. 1.

Figure 3:
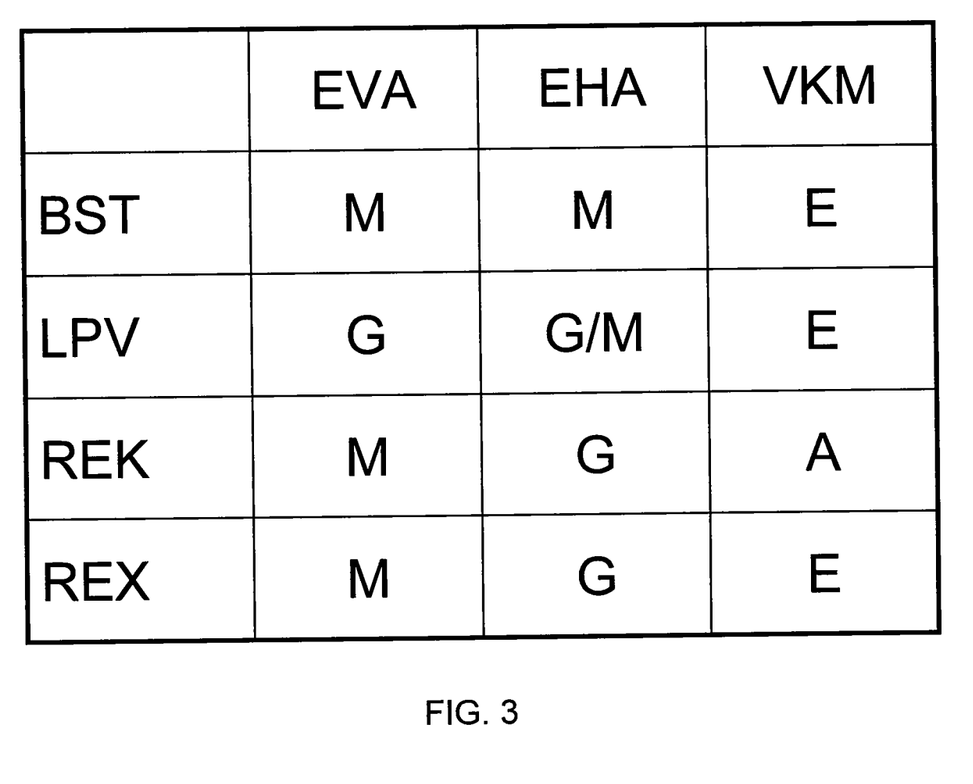
FIG. 3 shows an operating table of the drive device explaining an embodiment of the method according to aspects of the invention for a hybrid vehicle.

FIG. 3 shows an operating table of the drive device of the method according to aspects of the invention, comprising an operating strategy, wherein the calling of the individual operating states of the hybrid vehicle 1 is controlled via the control unit SE. The control unit SE controls here a changeover between the individual operating states of the hybrid vehicle 1 according to a predefined operating strategy. Criteria of the predefined operating strategy can, for example, be reduced consumption of the hybrid vehicle 1 or an increase in the range of the hybrid vehicle 1. In addition, avoidance of excessive cooling of a vehicle catalytic converter or of an exhaust gas post-treatment device of the hybrid vehicle or relatively low material loading of drive machines or drive train elements which are running at the same time, such as for example the internal combustion engine unit VKM, can also be used as criteria of the predefined operating strategy. For example, the operating strategy can bring about desired movement dynamics of the hybrid vehicle by avoiding or by preferring specific operating states, while including driving state variables and further data of the hybrid vehicle, or the outside temperature in the calculations.

The operating states are distinguished by different modes of the first motor/generator unit EVA, of the second motor/generator unit EHA and of the internal combustion engine unit VKM, wherein the first motor/generator unit EVA and the second motor/generator unit EHA can be operated as a motor or as a generator, or can be switched off. The internal combustion engine unit VKM can be switched on or off.

The respective modes of the first motor/generator unit EVA, of the second motor/generator unit EHA and of the internal combustion engine unit VKM are illustrated in the operating table in FIG. 3, for a first, second, third and fourth operating state of the internal combustion engine 1.

The first operating state BST comprises here a first motor/generator unit which is operated as a motor (M) and a second motor/generator unit which is operated as a motor (M) and a switched-on (E) internal combustion engine VKM. The first operating state BST is implemented, for example, as as electronic boosting of the hybrid vehicle 1, wherein the hybrid vehicle 1 is accelerated by positive drive torques, both of the internal combustion engine VKM and of the electric motor/generator units EHA, EVA.

The second operating state LPV comprises here a first motor/generator unit which is operated as a generator (G) and a second motor/generator unit EHA which can be operated as a motor or as a generator (G/M), wherein the internal combustion engine unit VKM is switched on (E). The second operating state LPV is configured, for example, as a load point shift of the internal combustion engine unit VKM, wherein the internal combustion engine unit VKM can be operated with operating parameters which are most favourable for the fuel consumption.

The third operating state REK comprises here a first motor/generator unit which is operated by motor (M), a second motor/generator unit which is operated as a generator (G) and a switched-off (A) internal combustion engine unit VKM. The third operating state REK is designed, for example, to perform recuperation during braking of the hybrid vehicle 1 or to recover energy by means of the second motor/generator unit EHA.

The fourth operating state REX additionally comprises a first motor/generator unit EVA which is operated as a motor (M), a second motor/generator unit EHA which is operated as a generator (G) and a switched-on (E) internal combustion engine unit VKM. The fourth operating state REX is configured as a mode for increasing the range of the hybrid vehicle 1.

Figure 4:
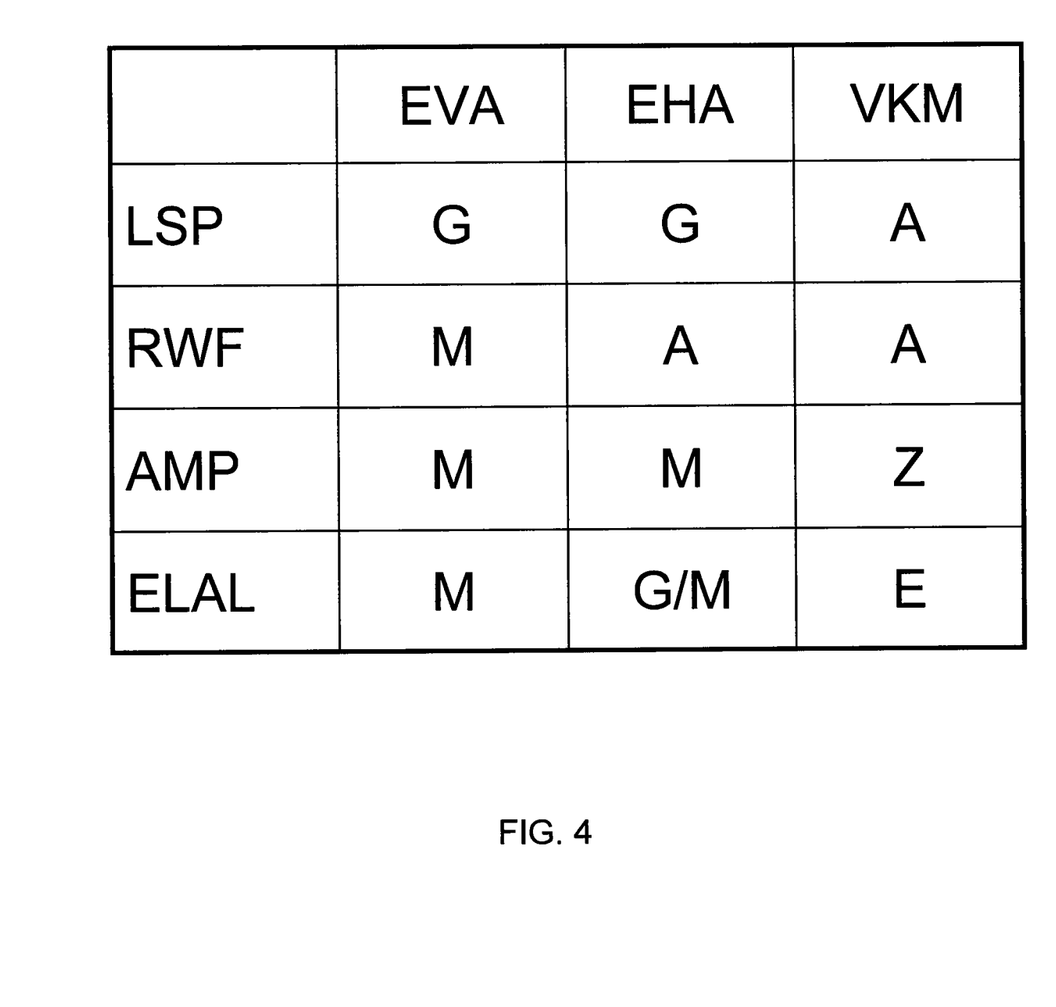
FIG. 4 shows an operating table of the drive device explaining a further embodiment of the method according to aspects of the invention for a drive device.

FIG. 4 shows an operating table of the drive device explaining a further embodiment of the drive method according to aspects of the invention for a drive device.

A further operating state LSP has here a first motor/generator unit which is operated as a generator (G), a second motor/generator unit which is operated as a generator (G) and a switched-off (A) internal combustion engine VKM. The operating state LSP is embodied, for example, as an operating state with long thrust phases for a sporty driving style.

A further operating state RWF comprises here a first motor/generator unit which is operated as a motor (M), and a switched-off (A) second motor/generator unit EHA, wherein the internal combustion engine unit VKM is switched off (A). The operating state RWF is implemented, for example, as an operating state for electrically reversing the hybrid vehicle 1.

In a further operating state AMP, the first motor/generator unit is operated as a motor (M) and the second motor/generator unit is operated as a motor (M), wherein the internal combustion engine unit VKM is started by an ignition process (Z). The operating state AMP is implemented, for example, as an operating state for starting the hybrid vehicle 1 at traffic lights.

A further operating state ELAL additionally comprises a first motor/generator unit EVA which is operated as a motor (M), a second motor/generator unit EHA, which is operated as a motor or as a generator (M/G), and a switched-on (E) internal combustion engine unit VKM. The operating state ELAL is implemented, for example, as an operating state for an electric all-wheel drive of the hybrid vehicle 1.

Figure 5:
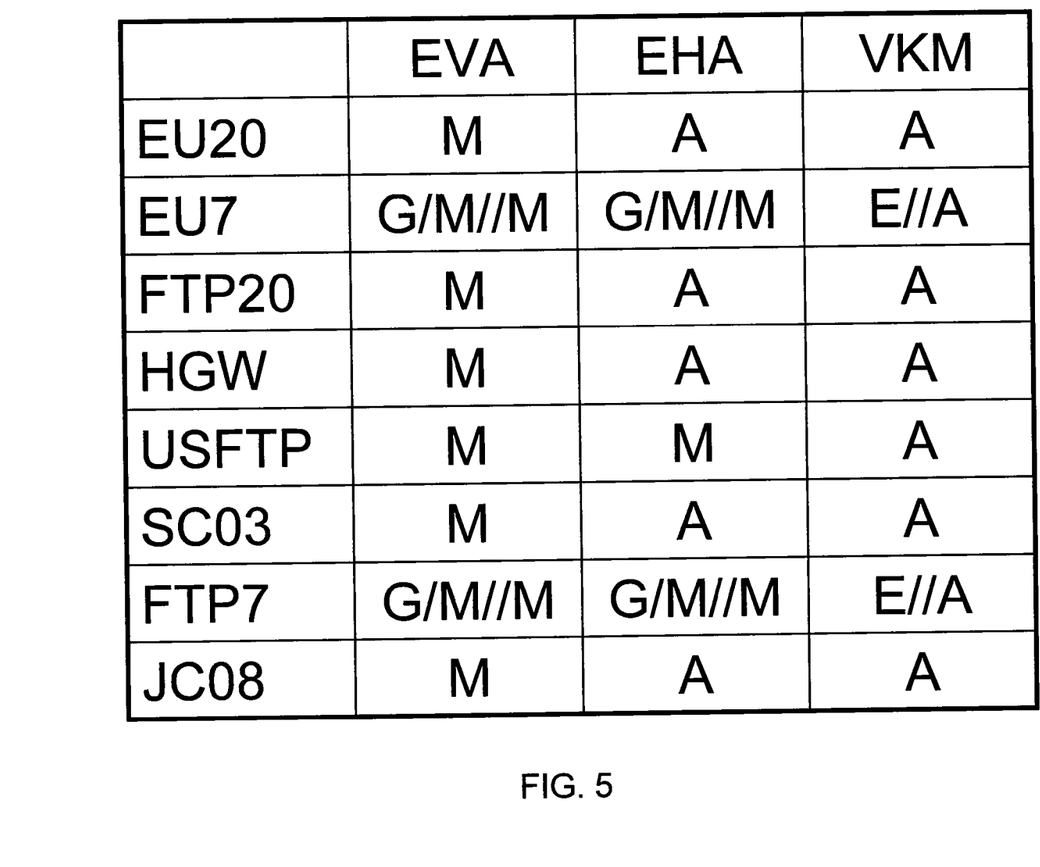
FIG. 5 shows an operating table of the drive device explaining a further embodiment of the method according to aspects of the invention for a drive device.

FIG. 5 shows an operating table of the drive device explaining a further embodiment of the drive method according to aspects of the invention for a drive device.

A further operating state EU20 has here a first motor/generator unit (EVA) which is operated as a motor (M), a switched-off (A) second motor/generator unit EHA, and a switched-off (A) internal combustion engine VKM. The operating state EU20 is configured, for example to prepare the hybrid vehicle 1 according to a new European Driving Cycle at an external temperature of 20° C.

A further operating state EU7 comprises here a first motor/generator unit EVA which is operated as a motor (M) and a second motor/generator unit EHA which is operated as a motor (M) wherein the internal combustion engine unit VKM is switched off (A), wherein, in the case of a prevailing battery temperature of below 15° C., the first motor/generator unit EVA and the second motor/generator unit EHA are operated as a motor or as a generator (G/M) and the internal combustion engine unit VKM is switched on (E). The operating state EU7 is configured, for example, to prepare the hybrid vehicle 1 according to a new European Driving Cycle at an external temperature of 7° C.

In a further operating state FTP20 the first motor/generator unit EVA is operated as a motor (M), wherein the second motor/generator unit EHA and the internal combustion engine unit VKM are switched off (A). The operating state FTP20 is configured, for example, to prepare the hybrid vehicle 1 according to an American Driving Cycle at an external temperature of 20° C.

In addition, a further operating state HGW comprises a first motor/generator unit EVA, which is operated as a motor (M), wherein the second motor/generator unit EHA and the internal combustion engine unit VKM are switched off (A). The operating state HGW is configured, for example, to prepare the hybrid vehicle 1 for a further driving cycle.

A further operating state USFTP has here a first motor/generator unit EVA which is operated as a motor (M) and a second motor/generator unit EHA which is operated as a motor (M), and a switched-off (A) internal combustion engine VKM. The operating state USFTP is configured, for example, to prepare the hybrid vehicle 1 for a further driving cycle which models a real journey.

A further operating state SC03 comprises here a first motor/generator unit EVA which is operated as a motor (M) and a switched-off (A) second motor/generator unit EHA, wherein the internal combustion engine unit VKM is switched off (A). The operating state SC03 is configured, for example, to prepare the hybrid vehicle 1 for a further driving cycle.

In a further operating state FTP7, the first motor/generator unit EVA is operated as a motor (M) and the second motor/generator unit EHA is operated as a motor (M), wherein the internal combustion engine unit VKM is started by an ignition process, wherein, in the case of a prevailing battery temperature below 15° C. the first motor/generator unit EVA and the second motor/generator unit EHA are operated as a motor or as a generator (G/M), and the internal combustion engine unit VKM is switched on (E).

The operating state FTP7 is configured, for example, to prepare the hybrid vehicle 1 according to an American Driving Cycle at an external temperature of 7° C.

In addition, a further operating state JC08 comprises a first motor/generator unit EVA which is operated as a motor (M), wherein the second motor/generator unit EHA and the internal combustion engine unit VKM are switched off (A). The operating state JC08 is configured, for example, for preparing the hybrid vehicle 1 for a further driving cycle.

Figure 6:
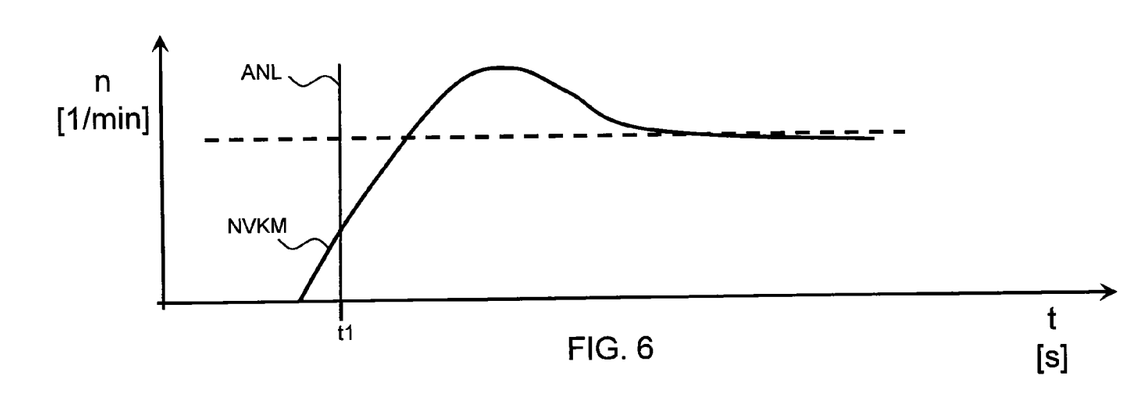
FIG. 6 shows a rotational speed characteristic curve of an internal combustion engine unit explaining a changeover of operating state according to a further embodiment of the present invention.

FIG. 6 shows a diagram relating to the chronological profile of the rotational speed n of the internal combustion engine unit during a first operating state changeover, which is referred to as ANL. The first operating state changeover ANL comprises restarting of the internal combustion engine unit VKM, wherein the second motor/generator unit EHA is operated as a motor, and wherein the internal combustion engine unit VKM which is connected thereto in a rotationally fixed fashion starts to rotate at the rotational speed NVKM and can be started at the time t1.

The rotational speed n of the internal combustion engine VKM is illustrated as a characteristic curve NVKM in a rotational speed time diagram. At the time of ignition, the rotational speed of the internal combustion engine unit VKM initially rises linearly and then approaches a predefined setpoint value asymptotically.

Figure 7:
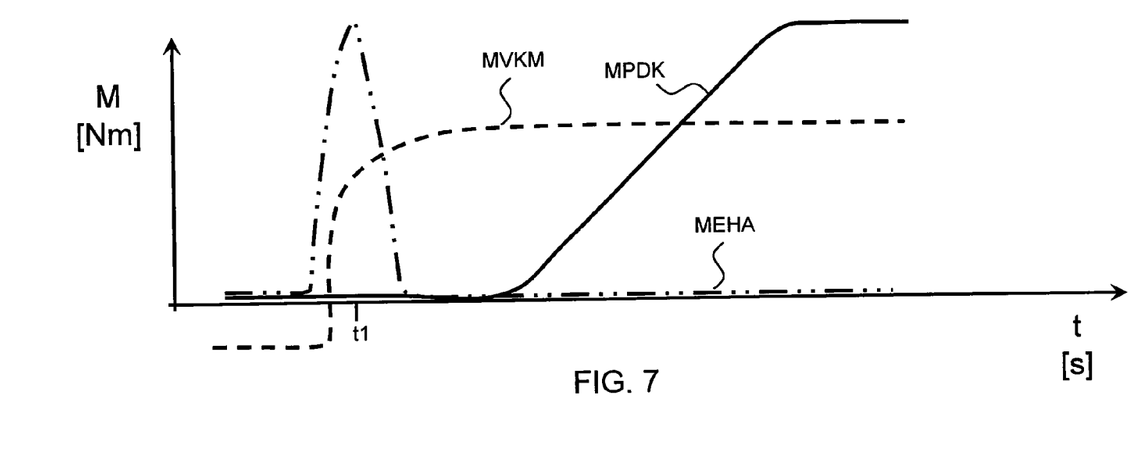
FIG. 7 shows a diagram of the respective torques of individual components of the drive device explaining a further embodiment of the method according to aspects of the invention.

FIG. 7 shows a torque diagram, which represents the chronological profile of the torques M of the individual components of the drive device. At the first operating state changeover ANL, the torque of the first electric motor/generator unit MEHA indicates a sudden rise which occurs at the time of ignition of the internal combustion engine unit VKM, wherein the torque of the first electric motor/generator unit MEHA drops to zero again after a restart of the internal combustion engine unit VKM. The torque of the internal combustion engine MVKM firstly has negative values, which is due to a mechanical resistance of the internal combustion engine unit VKM during the entrainment of the internal combustion engine unit VKM. The internal combustion engine unit VKM only outputs the torque MVKM generated by it to the drive device by means of the ignition at the time t1. At a later time, the torque which is output by the differential/transmission unit MPDK rises owing to a clutch engagement process, as a result of which the hybrid vehicle 1 is accelerated.

Figure 8:
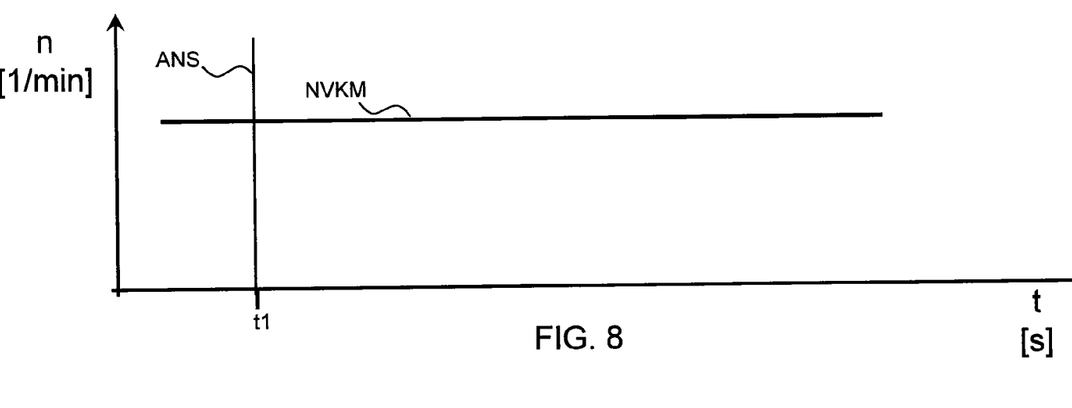
FIG. 8 shows a rotational speed characteristic curve of an internal combustion engine unit explaining a changeover of operating state according to a further embodiment of the present invention.

FIG. 8 shows a chronological profile of the rotational speed n of the internal combustion engine unit during a second operating state changeover denoted as ANS. The second operating state changeover ANS can be called by the control unit SE in the event of the hybrid vehicle 1 having a certain minimum speed. The second operating state changeover ANS comprises restarting of the internal combustion engine unit VKM, wherein a force flux between the second driven axle HA and the internal combustion engine unit VKM is connected by the clutch unit FK. Since the hybrid vehicle 1 has a certain speed in the present example, the internal combustion engine unit VKM begins to rotate at the rotational speed NVKM after the engagement of the clutch unit FK, and can therefore be started by the control unit SE. In this context, ignition of the internal combustion engine unit VKM takes place at the time t1.

Figure 9:
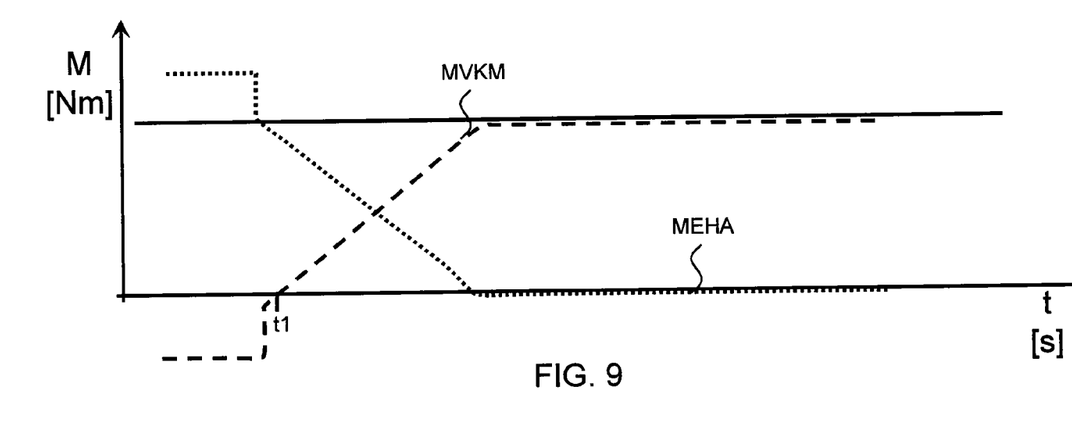
FIG. 9 shows a diagram of the respective torques of individual components of the drive device explaining an embodiment of the method according to aspects of the invention.

FIG. 9 shows the chronological profile of the torques M of the individual components of the drive device according to a further embodiment of the present invention. The torque of the internal combustion engine unit MVKM rises linearly after the ignition of the internal combustion engine unit VKM and reaches a predefined setpoint value. The torque of the electric machine MEHA drops from a first value to a second value after the ignition at the time t1 of the internal combustion engine unit VKM. The torque of the internal combustion engine unit MVKM initially has negative values, which is due to a mechanical resistance of the internal combustion engine unit VKM during the entrainment of the internal combustion engine unit VKM.

The invention claimed is:

1. A drive device for a hybrid vehicle, which has a first driven axle and a second driven axle, comprising:
   a first motor/generator unit, which is connected to the first driven axle;
   an internal combustion engine unit, which is connected in a rotationally fixed fashion to a differential/transmission unit which is connected to the second driven axle;
   a second motor/generator unit, which is connected in a rotationally fixed fashion to the differential/transmission unit, parallel to the internal combustion engine unit;
   a clutch unit, which is configured to disconnect and connect a force flux between the differential/transmission unit and the second driven axle; and
   a control unit, which actuates the clutch unit, the internal combustion engine unit, the first motor/generator unit and the second motor/generator unit as a function of predefined operating states.

2. The drive device as claimed in claim 1, wherein the first motor/generator unit comprises two electric machines which are each connected to wheels of the first driven axle.

3. The drive device as claimed in claim 1, wherein the clutch unit is embodied as a frictionally engaging clutch which is configured to be shifted by the control unit.

4. The drive device as claimed in claim 1, wherein the first motor/generator unit and the second motor/generator unit are each configured to be controlled by the control unit in a motor mode or in a generator mode.

5. A drive method for a hybrid vehicle, which has a first driven axle and a second driven axle, a first motor/generator unit which is connected to the first driven axle and a differential/transmission unit which is connected to the second driven axle and which is connected to an internal combustion engine unit and to a second motor/generator unit, said method comprising:
   using a clutch unit to disconnect and connect a force flux between the differential/transmission unit and the second driven axle; and
   using the control unit to actuate the clutch unit, the internal combustion engine unit, the first motor/generator unit and the second motor/generator unit as a function of predefined operating states.

6. The drive method as claimed in claim 5, wherein operating states of the drive device are activated by the control unit, wherein, in a first operating state, when the internal combustion engine unit is switched on, the first motor/generator unit and the second motor/generator unit are operated by motor;

wherein, in a second operating state, when the internal combustion engine unit is switched on, the first motor/generator unit is operated as a generator and the second motor/generator unit is operated as a generator or motor;

wherein, in a third operating state, when the internal combustion engine unit is switched off, the first motor/generator unit is operated as a motor and the second motor/generator unit is operated as a generator;

wherein, in a fourth operating state, when the internal combustion engine unit is switched on, the first motor/generator unit is operated as a motor and the second motor/generator unit is operated as a generator.

7. The drive method as claimed in claim 6, wherein the drive method has a further operating state which is activated by the control unit, wherein, when the internal combustion engine unit is switched off, the first motor/generator unit and the second motor/generator unit are operated as generators.

8. The drive method as claimed in claim 5, wherein the drive method has a further operating state which is activated by the control unit, wherein, when the internal combustion engine unit is switched off, the first motor/generator unit is operated as a motor.

9. The drive method as claimed in claim 5, wherein the drive method has a further operating state which is activated by the control unit, wherein, when the internal combustion engine unit starts, the first motor/generator unit and the second motor/generator unit are operated as motors.

10. The drive method as claimed in claim 5, wherein the drive method has a further operating state, which is activated by the control unit, wherein, when the internal combustion engine unit is switched on, the first motor/generator unit is operated as a motor and the second motor/generator unit is operated as a motor or as a generator.

11. The drive method as claimed in claim 5, wherein the drive method has a first changeover of operating state, which permits a changeover from an operating state with a switched-off internal combustion engine unit to an operating state with a switched-on internal combustion engine unit, by operating the second motor/generator unit as a motor.

12. The drive method as claimed in claim 11, wherein the drive method has a second changeover of operating state, which permits a changeover from an operating state with a switched-off internal combustion engine unit to an operating state with a switched-on internal combustion engine unit by entraining the internal combustion engine unit.

* * * * *